United States Patent [19]

Harada et al.

[11] Patent Number: 4,869,416
[45] Date of Patent: Sep. 26, 1989

[54] ASSEMBLY LINE CONVEYANCE

[75] Inventors: Saburo Harada, Higashihiroshima; Tatsuo Fujinaka, Iwakuni, both of Japan

[73] Assignee: Mazda Motor Corporation, Hiroshima, Japan

[21] Appl. No.: 356,632

[22] Filed: May 23, 1989

Related U.S. Application Data

[63] Continuation of Ser. No. 69,165, Jul. 2, 1987, abandoned.

[30] Foreign Application Priority Data

Jul. 9, 1986 [JP] Japan ............................ 61-162879
Jul. 9, 1986 [JP] Japan ............................ 61-106244

[51] Int. Cl.$^4$ ............................................ B23K 37/04
[52] U.S. Cl. ...................................... 228/4.1; 228/47; 269/296
[58] Field of Search .................... 228/4.1, 45, 47; 219/79, 80; 269/296

[56] References Cited

U.S. PATENT DOCUMENTS

| | | | |
|---|---|---|---|
| 3,433,370 | 3/1969 | Hastings et al. | 214/1 |
| 3,525,382 | 8/1970 | Devol | 164/154 |
| 4,046,263 | 9/1977 | Cwycyshyn et al. | 228/45 |
| 4,084,684 | 4/1978 | Skinner, II | 214/1 |
| 4,310,958 | 1/1982 | Balaud et al. | 219/86.7 |
| 4,429,862 | 2/1984 | Niedecker | 269/296 X |
| 4,611,749 | 9/1986 | Kawano | 228/45 |
| 4,667,866 | 5/1987 | Tobita et al. | 228/4.1 |
| 4,676,491 | 6/1987 | Radlof | 269/296 X |
| 4,678,110 | 7/1987 | Handa | 228/4.1 |

FOREIGN PATENT DOCUMENTS 151972 1/1983 Japan ..................... 228/47

Primary Examiner—Kenneth J. Ramsey
Attorney, Agent, or Firm—Burns, Doane, Swecker & Mathis

[57] ABSTRACT

A transporting and positioning method and an apparatus therefore utilizable in an assembly line. A first member is positioned at a first predetermined position while a second member to be connected together with the first member is positioned and held at a second predetermined position. The second member is then transported to a third predetermined position defined immediately above the first predetermined position. The second member so transported to the third connected together by, for example, spot-welding effected to the outer peripheral edges of the first and second members overlapping with each other.

10 Claims, 3 Drawing Sheets

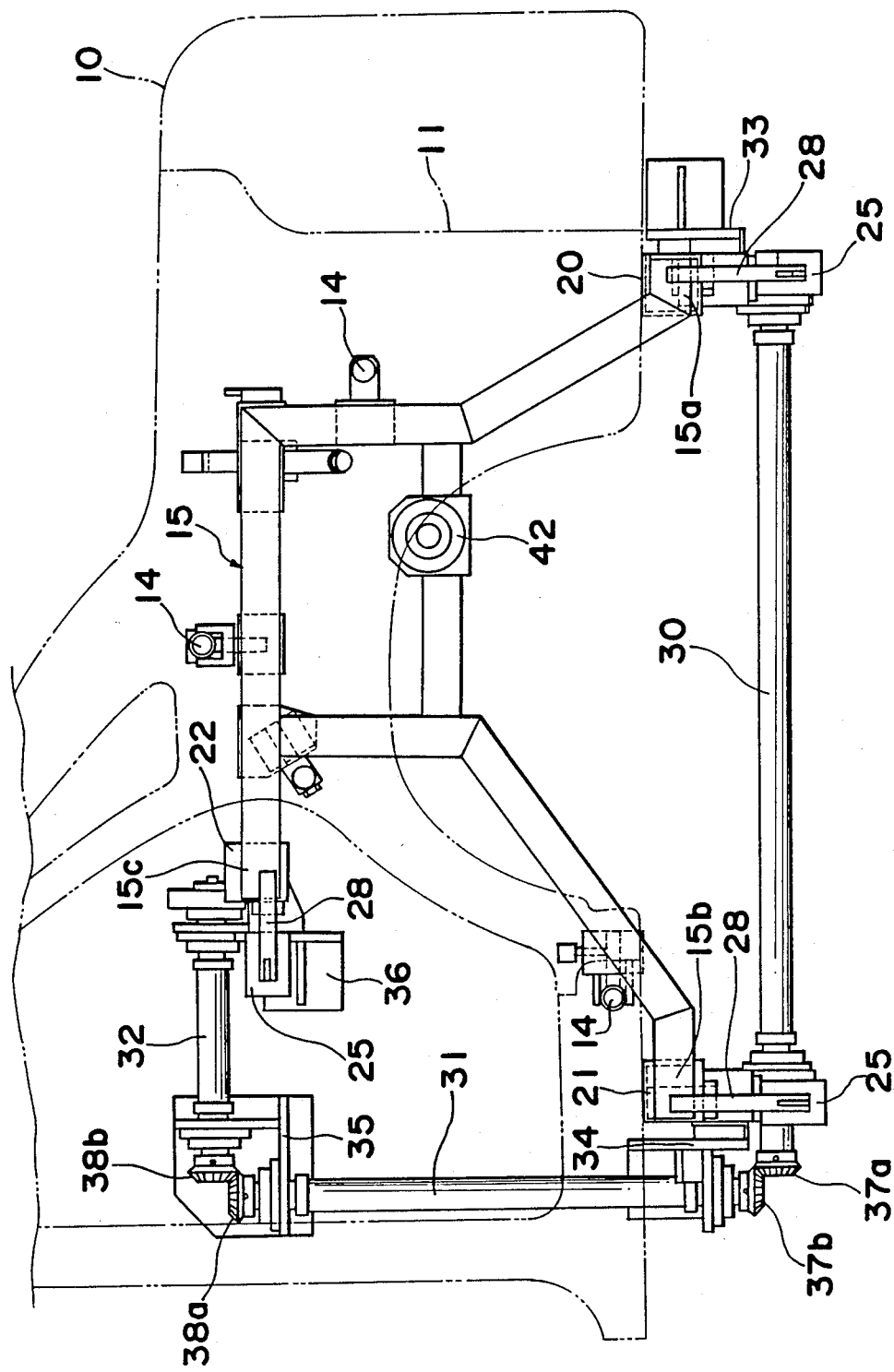

ASSEMBLY LINE CONVEYANCE

CROSS-REFERENCE TO THE RELATED APPLICATIONS

This application is a continuation of application Ser. No. 69,165, filed July 2, 1987 now abandoned.

U.S. Ser. No. 674,788, now U.S. Pat. No. 4,740,133 and entitled "COMPOSITE WORKING DEVICE USING A ROBOT AND METHOD OF ACCOMPLISHING COMPOSITE WORK USING A ROBOT", and U.S. Ser. No. 737,425, now U.S. Pat. No. 4,678,110 and entitled "VEHICLE BODY ASSEMBLY SYSTEM", both assigned to the same assignee of the present invention.

BACKGROUND OF THE INVENTION 1. (Field of the Invention)

The present invention relates to a method of and an apparatus for transporting and positioning an inner panel relative to an outer panel for connecting the inner and outer panels together in overlapping fashion.

2. (Description of the Prior Art)

The prior art transporting and positioning method of a type referred to above will be discussed with reference to FIG. 4 of the accompanying drawings. According to the prior art method, an outer panel 2 is transported to a first work support 1, and an inner panel 4 is transported to a second work support 3. The inner panel 4 so transported to the second work support 2 is then allowed to fall onto the outer panel 2, followed by the elevation of a work receptacle to lift the overlapping inner and outer panels 4 and 2. The overlapping inner and outer panels 4 and 2 are then connected together at a marriage processing station 6 by the use of a marriage technique. This prior method is disclosed in, for example, the Japanese Utility Model Publication No. 55-13184 published in 1980.

Since the prior art method described above is such that the inner panel 4 is allowed to fall onto the outer panel 2 prior to the both being connected together in overlapping fashion, the inner panel 4 tends to deviate in position relative to the outer panel 2 to such an extent as to result in reduction in the assembling efficiency.

OTHER PRIOR ART OF INTEREST

All of the following materials disclose a similar method and/or apparatus.

U.S. Pat. No. 3,433,370, issued Mar. 18, 1969, and entitled "CLAMP-ON LOAD HOOK";

U.S. Pat. No. 3,525,382, issued Aug. 25, 1970, and entitled "PROGRAM-CONTROLLED EQUIPMENT";

U.S. Pat. No. 4,046,263, issued Sept. 6, 1977, and entitled "TOOL CHANGING APPARATUS FOR A MULTI-AXIS MANIPULATOR";

U.S. Pat. No. 4,084,684, issued Apr. 18, 1978, and entitled "CONVEYOR TRANSFER METHOD AND APPARATUS"; and U.S. Pat. No. 4,611,749, issued Sept. 16, 1986, and entitled "METHOD OF AND SYSTEM FOR ASSEMBLING A PLURALITY OF PARTS INTO A UNIT".

SUMMARY OF THE INVENTION

The present invention has been devised with a view to substantially eliminating the problem inherent in the prior art method discussed above and has for its essential object to provide an assembly line conveyance effective to substantially eliminate any possible deviation in position between the inner and outer panels and also to improve the assembling efficiency.

In order to accomplish the above described object of the present invention, a method herein disclosed comprises a step of positioning a first member at a first predetermined position by means of a first positioning means; a step of positioning and holding a second member at a second predetermined position by means of a holding means of a manipulator used to transport the second member; a step of transporting by means of the manipulator the second member from the second predetermined position towards a third predetermined position defined above the first predetermined position at which the first member is positioned; a step of positioning and clamping the handling means of the manipulator which has been moved to the third predetermined position; and a step of unchucking the handling means, which has been clamped at the third predetermined position, from the manipulator and lowering by means of a lifting means the handling means then holding the positioned second member to connect the first and second members together in overlapping fashion while having been positioned relative to each other.

The transporting and positioning apparatus capable of executing the above described method according to the present invention comprises a first positioning means for positioning a first member at a predetermined position; a manipulator for transporting a handling means, then holding a second member, to a location above the first member; said first positioning means including a plurality of lifting means each having a lifting member; a holding means provided in the respective lifting member for holding the handling means above the first member; and a synchronizing means provided in each of the lifting means for moving the lifting members simultaneously and over an equal distance.

According to the present invention, since the first and second members, that is, the outer an inner panels, can be held in overlapping relation to each other while having been accurately positioned relative to each other, the outer and inner panels can be advantageously welded together by the use of any spot-welding technique without any deviation in position therebetween. Therefore, the assembling efficiency can be advantageously improved.

BRIEF DESCRIPTION OF THE DRAWINGS

This and other objects and features of the present invention will become clear from the following detailed description of the present invention taken in conjunction with a preferred embodiment thereof with reference to the accompanying drawings, in which:

FIG. 2 is a plan view, on an enlarged scale, of the transporting and positioning apparatus;

DETAILED DESCRIPTION OF THE EMBODIMENT

Figure 1:
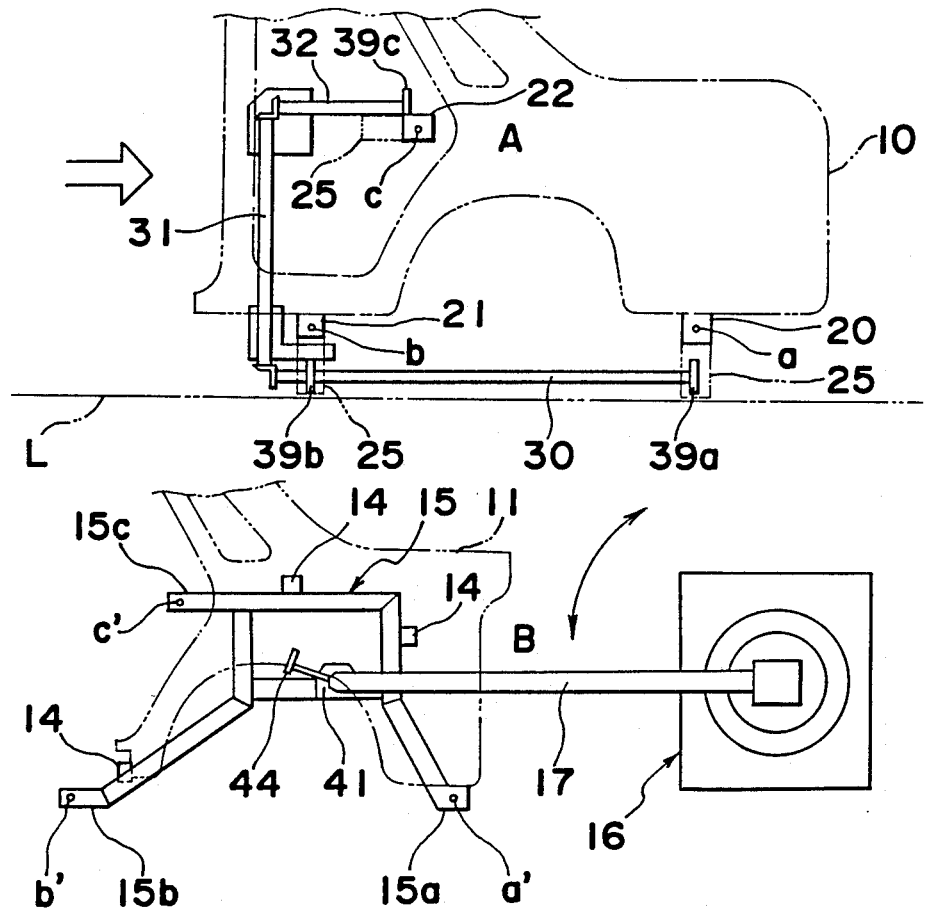
FIG. 1 is a fragmentary plan view of an assembly line employing a transporting and positioning apparatus according to the present invention.
Figure 4:
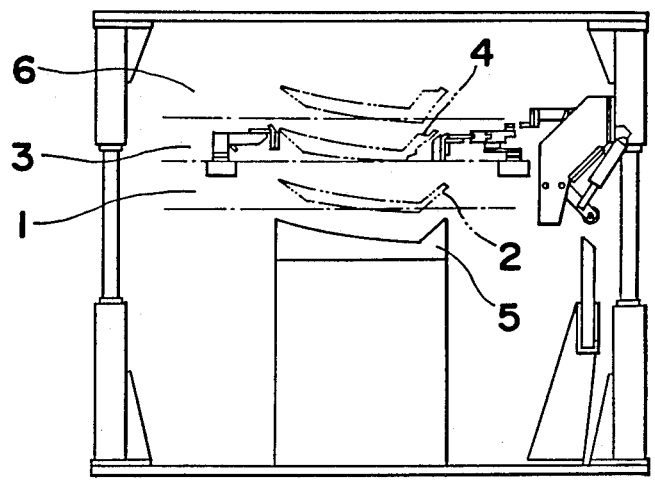
FIG. 4 is a side view of the prior art transporting and positioning apparatus.

Referring to FIG. 1, there is partly shown an automobile assembly line in which an apparatus according to the present invention is provided for transporting an inner panel 11 towards a position immediately above an outer panel 10 and for subsequently positioning the inner and outer panels 11 and 10 relative to each other so that the both can be connected together in overlapping fashion, it being to be noted that both of the inner and outer panels 11 and 10 shown therein form a part of a rear body structure of an automobile.

The assembly line L has a first predetermined position A at which an outer jig 12 (FIG. 3) is arranged. The outer panel 10 is placed and retained in position on the outer jig 12 with its outer peripheral edges clamped by a first clamper (not shown).

The first predetermined position A is defined above a transport conveyor and moves in an assembling direction. However, since a robot 16 arranged at a second predetermined position B as will be described later also moves in synchronism with the movement of the first predetermined position A, the first predetermined position A is assumed, in the following description for the sake of brevity, to be stationary relative to the robot 16.

The second predetermined position B is defined laterally of the first predetermined position A of the assembly line L. At this second predetermined position B, both of a material handling jig 15, including a plurality of clampers 14 clamping the inner panel 11, and the robot 16 are arranged. The robot 16 an arm 17 by which the material handling jig 15 is chucked so that the material handling jig 15 can be moved by the robot 16 to a third predetermined position C defined immediately above the first predetermined position A.

Figure 3:
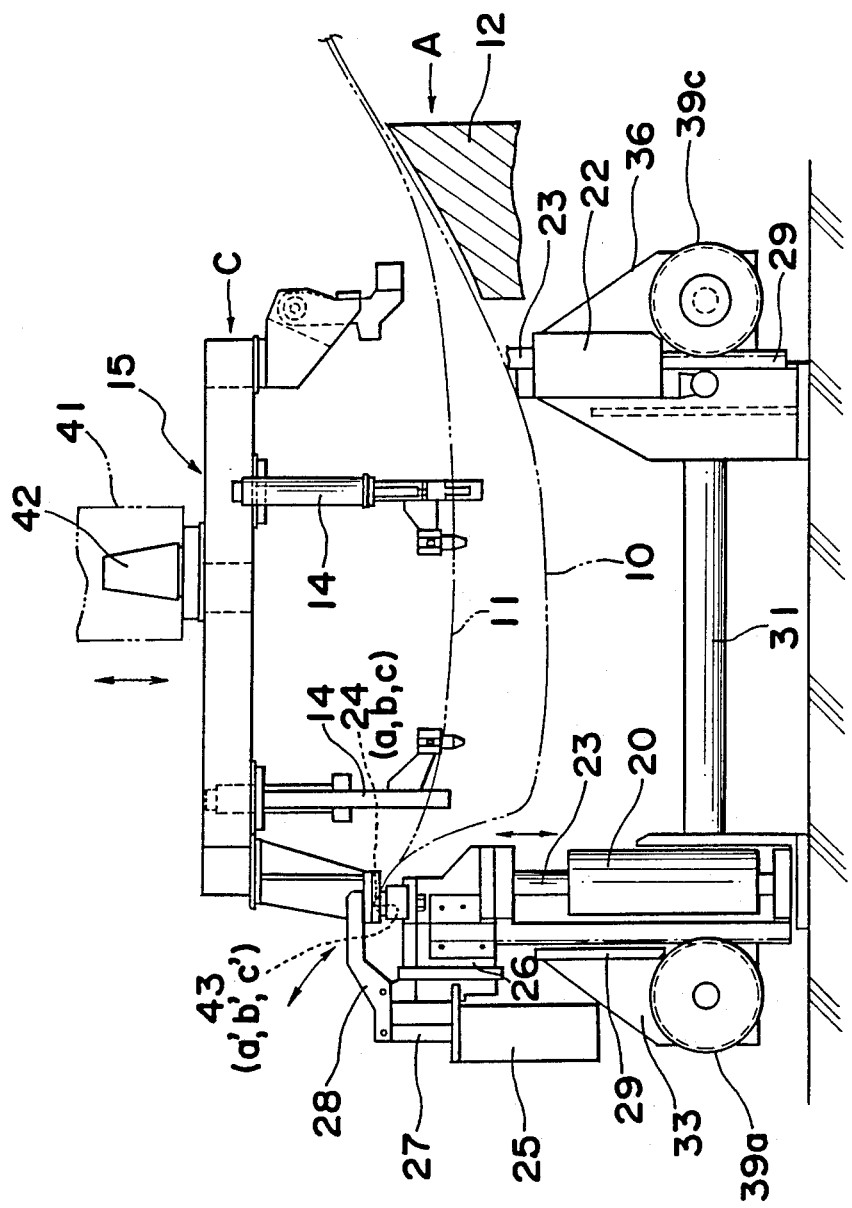
FIG. 3 is a side view of the apparatus as viewed from a right-hand portion of FIG. 2.

As shown in detail in FIGS. 2 and 3, a plurality of lifting cylinders 20, 21 and 22 are arranged at the first predetermine position A and are so positioned that they will not interfere with the outer panel 10 then clamped on the outer jig 12. Each of these lifting cylinders 20 to 22 includes a piston rod 23 supported for movement between lifted and lowered positions, said piston rod 23 having an upper end fitted with a generally semi-spherical positioning projection 24 (a, b, c) as shown in FIG. 1.

Material handling clamp cylinders 25 are mounted on upper side portions of the associated piston rods 23, respectively, through corresponding brackets 26, each of said clamp cylinders 25 including a piston rod 27 to which a respective clamp arm 28 operable to clamp from above a corresponding positioning leg 15a, 15b or 15c of the material handling jig 15 that is engaged in the associated positioning projection 24 of the piston rod 27 is connected. Each of the piston rods 23 of the respective lifting cylinders 20 to 23 has a rack 29 carried thereby so as to extend vertically parallel to the associated piston rod 23.

A first synchronizing shaft 30 is positioned on a right-hand side of, and extends between, the front right-hand and rear right-hand lifting cylinders 20 and 21 so as to extend in a direction conforming to the direction of the assembly line L; a second synchronizing shaft 31 is disposed rearwardly of the rear right-hand lifting cylinder 21 so as to extend in a direction perpendicular to the direction of the assembly line L; and a third synchronizing shaft 32 is disposed on a left-hand side of the rear left-hand lifting cylinder 22 so as to extend in a direction conforming to the direction of the assembly line L. The first synchronizing shaft 30 is rotatably supported by spaced brackets 33 and 34; the second synchronizing shaft 31 is rotatably supported by spaced brackets 35 and 36.

A rear end of the first synchronizing shaft 30 has a bevel gear 37a rigidly mounted thereon for rotation together therewith, which bevel gear 37a is meshed with a similar bevel gear 37b rigidly mounted on a right-hand end of the second synchronizing shaft 31 for rotation together therewith. Similarly, a left-hand end of the second synchronizing shaft 31 has a bevel gear 38a rigidly mounted thereon for rotation together therewith, which bevel gear 38a is meshed with a similar bevel gear 38b rigidly mounted on a rear end of the third synchronizing shaft 32 for rotation therewith.

A front end of the first synchronizing shaft 30 remote from the bevel gear 37a has a pinion gear 39a rigidly mounted thereon and engaged with the rack 29 carried by the front right-hand lifting cylinder 20; the rear end of the first synchronizing shaft 30 has a pinion gear 39b rigidly mounted thereon and meshed with the rack 29 carried by the rear right-hand lifting cylinder 21; and a front end of the third synchronizing shaft 32 remote from the bevel gear 38b has a pinion gear 39c rigidly mounted thereon and meshed with the rack 29 carried by the rear left-hand lifting cylinder 22.

In the construction so far described, when operating fluid under pressure is supplied to the cylinders 20 to 22 with the respective piston rods 23 consequently elevated, that is, moved from the lowered position towards the lifted position, the racks 29 fast with the respective piston rods 23 of the lifting cylinders 20 to 22 cause the associated first to third synchronizing shafts 30 to 32 to be driven through the pinion gears 39a to 39c by way of the corresponding bevel gears 37a and 37b, 38a and 38b. Accordingly, since the piston rods 23 are cyclically synchronized with each other through the racks 29, the pinion gears 39a to 39c, the first to third synchronizing shafts 30 to 32 and the bevel gears 37a, 37b, 38a and 38b, the piston rod 23 moving towards the lifted positions can be simultaneously driven over an equal stroke.

At a generally central portion of the material handling jig 15, the material handling jig 15 has fitted thereto a chucking member 42 adapted to be removably chucked by a chuck mechanism 41 mounted on the arm 17 of the robot 16. The material handling jig 15 also carries a plurality of second positioning clampers 14 mounted on an arm portion thereof for clamping and positioning the outer peripheral edge of the inner panel 11 as well as the peripheral lip region of the inner panel 11 around an opening defined therein.

Respective ends of arms of the material handling jig 15 are provided with the associated positioning legs 15a to 15c formed with respective positioning recesses 43 (a', b', c') into which the associated positioning projections 24(a, b, c) fitted to the piston rods 23 of the lifting cylinders 20 to 22 are engageable from above.

The transporting and positioning apparatus of the construction as hereinabove described operates in the following manner.

The outer panel 10 is place, and clamped by the first clampers and, therefore, positioned, on the outer jig 12 arranged at the first predetermined position A on the assembly line L. On the other hand, the material handling jig 15 is chucked by the arm 17 of the robot 16 arranged at the second predetermined position B laterally of the assembly line L, and the inner panel 11 is positioned and clamped by the second clampers 14.

When the arm 17 of the robot 16 is swung, the inner panel 11 is transported together with the material handling jig 15 toward the third predetermined position C defined immediately above the outer panel 10 held at the first predetermined position A. The subsequent lowering of the arm 17 of the robot 16 causes the positioning recesses 43 (a', b', c') in the respective positioning legs 15a to 15c of the material handling jig 15, then lowering together with the arm 17, to receive therein the positioning projections 24 (a, b, c) of the piston rods 23 of the lifting cylinders 20 to 22, thereby to accomplish the positioning. At this time such a condition as shown in FIG. 3 (the third predetermined position C) is established, and in this condition, a slight gap is formed between the outer and inner panels 10 and 11.

The material handling clamp cylinders 25 are subsequently actuated to allow the positioning legs 15a to 15c of the material handling jig 15 to be clamped by the clamp arms 28 from above. Following this, the chuck member 42 of the material handling jig 15 is unchucked from the chuck mechanism 41 on the arm 17 of the robot 16.

Thereafter, an when the lifting cylinders 20 to 23 are brought in a lowering stroke, the inner panel 11 is lowered together with the material handling jig 15 so that the inner panel 11 can be positioned, in overlapping relationship, on the outer panel 10 then clamped on the outer jig 12.

Since the piston rods 27 of the respective material handling clamp cylinders 25 are connected through the racks 29, the pinion gears 39a to 39c and the first to third synchronizing shafts 30 to 32, the cylinders 20 to 22 can during their lowering strokes be lowered an equal distance simultaneously and, therefore, there is no possibility that the material handling jig 15 may be leaned and-/or displaced in position.

After the outer peripheral edges of the outer and inner panels 10 and 11 having been so positioned so as to overlap one above the other have been clamped by other clampers, the clamped outer peripheral edges of the outer and inner panels 10 and 11 are spot-welded by the use of a spot-welding gun 44 fitted to a free end of the arm 17 of the robot 16 or a spot-welding gun fitted to any other robot.

As hereinbefore described, according to the present invention, the spot-welding can be effected while the outer and inner panels 10 and 11 are overlapped while having been accurately positioned relative to each other, no displacement in position occur between the outer and inner panels 10 and 11.

Although the present invention has been fully described in connecting with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A transporting and positioning apparatus which comprises:
    a first positioning means for positioning a first member at a predetermined position;
    a manipulator for transporting a handling means holding a second member at a first location above the first member;
    said first positioning means including a plurality of lifting means each having a lifting member positioned laterally of said first positioning means for holding the handling means above the first member, the handling means being positioned and supported by the lifting means at upper and lower positions, the upper position coinciding with the first location so that the lifting means receives the handling means from the manipulator above the lower position, and the lower position enabling the second member to be lowered onto the first member, the second member is lowered onto the first member when the manipulator is separated from the handling means;
    said lifting means including a base portion, a drive means, and a lifting portion selectively lifted and lowered relative to a base portion, the lifting portion of the lifting means provided with a clamping means for holding a positioning portion of the handling means while the second member is retained above the first member;
    a synchronizing means provided in each of the lifting means for moving the lifting members simultaneously and over an equal distance;
    said second member positioned over said first member at the upper location by an engagement between first positioning portions disposed at the tops of the lifting members and a second positioning portions on the handling means, the clamping means arranged for clamping said engagement;
    one of the first and second positioning portions being a semisphere and the other being a recess receiving the semisphere;
    said manipulating means carrying a welding gun for welding the first and second members together.

2. The apparatus as claimed in claim 1, wherein the handling means has a central portion supported by the manipulator.

3. The apparatus as claimed in claim 2, wherein said first positioning means includes at least three lifting means.

4. The apparatus as claimed in claim 2 wherein the number of the lifting means is at least three.

5. The apparatus as claimed in claim 1, wherein the positioning of the first and second members is carried out in a substantially horizontal condition and wherein respective overlapping portions of the first and second members have associated surface portions inclined from the horizontal condition.

6. The apparatus as claimed in claim 5, wherein the positioning of the second member comprises an engagement between the positioning portion at the top of the lifting means and a positioning portion of a hanging means for holding the second member, and a clamping means for clamping such engagement.

7. The apparatus as claimed in claim 6, wherein the positioning portion at the top of the lifting means is a projection and the positioning portion of the hanging means is a recess.

8. The apparatus as claimed in claim 6, wherein said clamping means comprises a clamp arm for supporting from above the engagement between the positioning portion at the top of the lifting means and the positioning portion of the hanging means for holding the second member.

9. The apparatus as claimed in claim 1, wherein the first positioning portion at the top of the lifting means is a semisphere and the second positioning portion is a recess.

10. The apparatus as claimed in claim 1, wherein said clamping means comprises a clamp arm for supporting from above the engagement between the first and second positioning portions.

* * * * *